March 10, 1942.    T. S. GRIMES    2,275,755
COTTON GIN
Filed Aug. 4, 1940

INVENTOR
THADDEUS S. GRIMES
BY
Johnston + Jennings
ATTORNEYS

Patented Mar. 10, 1942

2,275,755

UNITED STATES PATENT OFFICE 2,275,755

COTTON GIN

Thaddeus S. Grimes, Columbus, Ga., assignor to Lummus Cotton Gin Company, a corporation of Georgia Application August 4, 1940, Serial No. 351,394

4 Claims. (Cl. 19—59)

My invention relates to cotton gins, and has for its principal object the provision of an improved means whereby the peppery trash and other fine foreign matter may be discharged from the gin.

A still further object of my invention is to provide a cotton gin including an air blast for stripping the lint from the saw cylinder, and a controlled induced air flow for diverting fine trash away from the lint duct.

In my prior Patent No. 2,053,190, dated September 1, 1936, there is disclosed and claimed a means for removing motes and trash thrown off by centrifugal force from the saw cylinder of the gin, comprising a conveyor belt disposed immediately to the rear of the saw cylinder and above the air blast nozzle. The construction therein shown and claimed has proved highly successful in use, but I have found that I can produce a still better result by controlling and directing the air induced by the air blast so as to form a shielding air stream over the air blast to divert light, peppery trash away from the lint duct. In actual practice I have found that when ginning dirty cotton the value may be improved by a full grade by the improvements herein disclosed.

Figure 1:
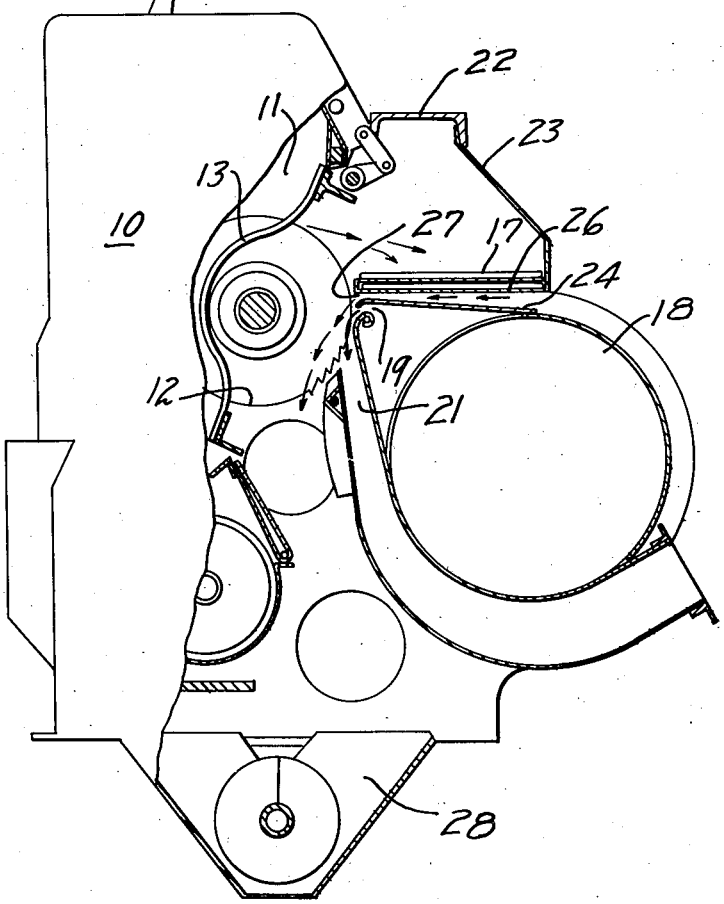
Figure 2:
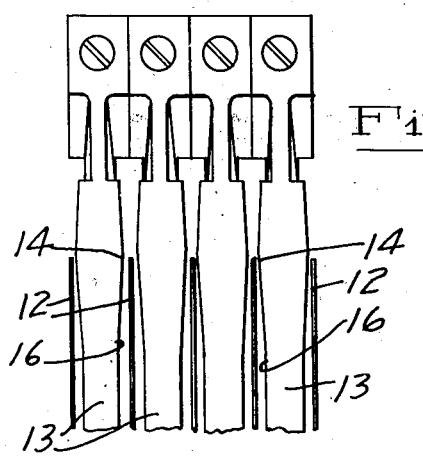

Apparatus embodying features of my invention is illustrated in the accompanying drawing forming a part of this application, in which Fig. 1 is a view in elevation, partly in section, of a gin constructed according to my invention; and Fig. 2 is a fragmentary front view of the saw cylinder and gin ribs.

Referring to the drawing for a better understanding of my invention, I show a gin 10 including a roll box 11, a saw cylinder 12, and gin ribs 13. As shown in Fig. 2, the gin ribs 13 are made wider near the peripheries of the saw, as shown at 14, to provide a relatively close lateral clearance between the peripheries of the saw and the ribs in stripping the lint from the seeds, the ribs narrowing immediately above the periphery of the saw to afford clearance for the lint being pulled from the seeds. In the action just described, the heavy motes, or small undeveloped seeds, are drawn between the clearance openings 16 with the lint and thrown off by centrifugal force on to the belt conveyer 17, which extends along the gin stand to the rear of the saw cylinder 12, as described in my prior patent aforesaid. At the rear of the gin stand and beneath the conveyer 17 is an air blast supply duct 18, which supplies air under pressure for stripping the lint from the saw cylinder 12. Connected to the air duct 18 is an air blast nozzle 19, which is disposed substantially in the horizontal plane passing through the axis of the saw cylinder and is directed downwardly and tangentially of the saw cylinder 12 to strip the lint therefrom. The blast from the nozzle 19 is at a very high velocity, being about 12,000 feet per minute, so that it readily removes the lint from the saw teeth and directs it downwardly into a lint duct 21 having its entrance opening disposed immediately beneath the air blast nozzle 19, and which leads to a lint offtake flue (not shown).

The high velocity air blast induces a current of air from the outside of the gin stand which, if uncontrolled and undirected, follows the air blast into the lint duct 21, carrying with it the light, peppery trash which was not thrown off by centrifugal force from the saw cylinder, but which tends to fall down between the saws to the trash conveyer. In order to overcome this difficulty, I have closed off the upper part of the gin, as by means of plates 22 and 23, so that no air can enter it above the air blast nozzle, except as will presently be described. With the gin in operation, the roll box 11 and gin breast are full of cotton, so that air can not enter from that direction. Immediately above the air blast nozzle 19 I provide a passage for induced air extending entirely across the gin and formed by the upper wall 24 of the air blast nozzle, and the plate 26 supporting the lower reach of the belt conveyer 17. The passage thus formed is open at its outer end to the atmosphere and its inner end terminates at 27 in a nozzle immediately over the air blast nozzle 19. The nozzle 27 is directed downwardly and inwardly of the saw cylinder 12 to divert the light, peppery trash away from the lint duct 21. As shown, the walls 24 and 26 of the induced air blast nozzle 27 preferably diverge from the nozzle outward to induce a smooth stream of air to discharge over the air blast nozzle. This induced air stream is at a velocity much lower than that of the air blast and does not interfere with the stripping of the lint from the saw cylinder, but is sufficiently strong to divert the motes and peppery trash away from the lint duct and cause it to fall downwardly through the gin where it is discharged into a conveyer trough 28 in the bottom of the gin.

It will be apparent from the foregoing that I have devised an improved means for cleaning the cotton being ginned of fine, peppery trash by introducing a controlled induced clean air stream directed over the air blast, which prevents dirty, dusty air from between the saws entering the lint duct.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

I claim:

1. A cotton gin embodying a mote conveyer housing, an air blast nozzle, an air duct for supplying air to the air blast nozzle, a lint duct, an induced air nozzle defined between the bottom of the conveyer housing and the top of the air duct, and means at the inner end of the induced air nozzle for directing the air induced therein inwardly of the gin to divert foreign matter away from the lint duct.

2. In a cotton gin, a saw cylinder, an air blast nozzle, an air duct for supplying air to the air blast nozzle, a lint duct, a mote conveyer housing located above the air duct, an inwardly converging induced air nozzle formed between the housing and the air duct and extending continuously across the gin, and means at the inner end of the induced air nozzle for directing the air induced therein inwardly and downwardly of the saw cylinder to divert foreign matter away from the lint duct.

3. In a cotton gin, a saw cylinder, an air blast nozzle defined at its top by a plate, an air duct for supplying air to the air blast nozzle, a lint duct, a substantially horizontal conveyer housing extending across the gin over the air duct with its inner edge adjacent the saw cylinder, an induced air nozzle formed between said plate and said housing with its inner end in position with respect to the air blast nozzle for the induction of a stream of air therein, and means for directing the induced air inwardly and downwardly of the saw cylinder to divert foreign matter away from the lint duct.

4. In a cotton gin, a saw cylinder, an air blast nozzle, an air duct for supplying air to the air blast nozzle, a mote conveyer housing having a lower wall disposed immediately above the air duct and forming therewith an induced air nozzle directed inwardly of the saw cylinder immediately over the air blast nozzle, and means forming a dead air chamber above the conveyer housing.

THADDEUS S. GRIMES.